United States Patent
Ibrahim

(10) Patent No.: US 7,830,120 B2
(45) Date of Patent: Nov. 9, 2010

(54) LOW SIDE N-CHANNEL FET PROTECTION CIRCUIT

(75) Inventor: Randolph A. Ibrahim, Sedalia, CO (US)

(73) Assignee: Nexergy, Inc., Columbus, OH (US)

( * ) Notice: Subject to any disclaimer, the term of this patent is extended or adjusted under 35 U.S.C. 154(b) by 663 days.

(21) Appl. No.: 11/857,342

(22) Filed: Sep. 18, 2007

(65) Prior Publication Data
US 2009/0072790 A1    Mar. 19, 2009

(51) Int. Cl.
  H02J 7/00    (2006.01)
  G01N 27/42   (2006.01)
  G08B 21/00   (2006.01)
  H02H 3/00    (2006.01)
  H02H 7/18    (2006.01)

(52) U.S. Cl. .................. 320/134; 320/132; 320/135; 320/149; 320/163; 324/426; 324/428; 324/432; 324/433; 324/434; 340/636.1; 340/636.21; 361/18; 361/84; 361/87; 361/93.1; 361/100; 307/10.7; 379/323

(58) Field of Classification Search .......... 320/134; 324/433
See application file for complete search history.

(56) References Cited

U.S. PATENT DOCUMENTS

| | | | |
|---|---|---|---|
| 5,530,336 A * | 6/1996 | Eguchi et al. | 320/118 |
| 6,008,627 A | 12/1999 | Narita | |
| 6,222,346 B1 | 4/2001 | Mori | |
| 6,313,610 B1 | 11/2001 | Korsunsky | |
| 6,320,355 B1 | 11/2001 | Terada | |
| 6,340,889 B1 | 1/2002 | Sakurai | |
| 6,580,250 B1 | 6/2003 | Stellberger et al. | |
| 6,670,790 B2 | 12/2003 | Stellberger | |
| 6,771,049 B2 | 8/2004 | Kawagoe et al. | |
| 6,992,463 B2 | 1/2006 | Yoshio | |
| 2001/0052759 A1* | 12/2001 | Sakurai et al. | 320/134 |
| 2003/0132732 A1* | 7/2003 | Thomas et al. | 320/134 |
| 2004/0189259 A1* | 9/2004 | Miura et al. | 320/134 |
| 2005/0077878 A1* | 4/2005 | Carrier et al. | 320/134 |
| 2005/0127878 A1* | 6/2005 | Geren et al. | 320/134 |

(Continued)

OTHER PUBLICATIONS

"Data Sheet—NE57600 One-cell Lithium-ion battery protection with over/undercharge and overcurrent protection", Product data, *Phillips Semiconductors*, Oct. 3, 2001; retrieved from the Internet at www.datasheetcatalog.com; pp. 1-13.

(Continued)

*Primary Examiner*—Edward Tso
*Assistant Examiner*—Yalkew Fantu
(74) *Attorney, Agent, or Firm*—Townsend and Townsend and Crew LLP

(57) ABSTRACT

The present invention relates to a battery protection circuit for protecting a plurality of batteries connected in series. The battery protection circuit includes: a controller for monitoring the batteries and outputting control signals based on predetermined conditions associated with the batteries; a first N-channel MOSFET and a second N-channel MOSFET coupled in a common-drain configuration in a low-side path, wherein at least one of the first and second N-channel MOSFETs turns off in response to the control signal received from the controller when at least one of the predetermined conditions is detected; and a gate protection circuit for preventing gate-to-source voltages of the first and second N-channel MOSFETs from exceeding a predetermined gate-to-source voltage level.

24 Claims, 7 Drawing Sheets

U.S. PATENT DOCUMENTS

2005/0182987 A1   8/2005   Sakurai
2007/0013342 A1   1/2007   Suzuki et al.

OTHER PUBLICATIONS

Product Data—bq20z70—"SBS1.1-Compliant Gas Gauge Enabled With Impedance Track™ Technology For Use With the bq29330", SLUS686A, Nov. 2005, *Texas Instruments*, pp. 1-22.

Product Data—"Protection for Lithium-Ion Batteries (3/4-serial cells)—Monolithic IC MM1414", *Mitsumi*, Apr. 14, 1999, pp. 1-9.

Product Data Sheet—"Sion Power—Lithium Sulfur Rechargeable Battery", Sep. 28, 2005, *Sion Power, Inc.*;retrieved from the Internet on Mar. 11, 2007 at http://www.sionpower.com/pdf/sion_product_spec.pdf; pp. 1-2.

Internet article: "A primer on high-side FET load switches (Part s 1 & 2)" *Industrial Control Designline* (May 3, 2007); retrieved from the internet on Jun. 5, 2007 at www.industrialcontrol designline.com/showArticle.jhtml?printableArticle=true&articl... ;pp. 1-5; 1-3.

Akridge, Robert J. "Lithium Sulfur Rechargeable Battery Safety", *Battery Power Products & Technology* (2001) (reprint), pp. 1-3.

* cited by examiner

LOW SIDE N-CHANNEL FET PROTECTION CIRCUIT

BACKGROUND OF THE INVENTION

The present invention relates to a battery protection circuit having protection functions that turn off the current path when an abnormal condition occurs in a battery pack, in particular, but not by way of limitation, of a plurality of Lithium Sulfur (LiS) batteries connected in series.

Lithium Sulfur (LiS) rechargeable batteries provide users with high-energy and light-weight solutions. For example, LiS batteries developed by Sion Power™ Corporation, Tucson Ariz., are reported to be capable of delivering a specific energy of 400 Wh/kg and an energy density of 425 Wh/liter. The specific energy of the LiS battery exceeds that of state-of-the-art Lithium Ion (Li Ion) chemistry by a factor of greater than two, while the energy density stands at an equivalent level. That is, a LiS battery provides the same runtime for a portable computer in less than half the weight, or twice the runtime in the same weight while having a volume comparable to a Lithium Ion battery. Another reported advantage of LiS batteries is their ability to work well in very cold weather. Typical applications include unmanned aerial vehicles, military communication systems, rugged notebook computers, tablet personal computers, and portable medical devices.

Battery packs containing multiple battery cells are used to power up various pieces of equipment. To assure that each battery in the pack operates safely and gives the expected performance, the batteries can be protected from abnormal conditions such as over-charge or over-discharge conditions. Furthermore, most batteries generate heat as they charge; for some type of batteries, excessive charge can pose a potential fire risk. Conventional heat management involves heat sinking by using, for example, circuit boards with large copper areas, thereby increasing the cost.

Since a LiS battery is capable of providing the same runtime in less than half the weight as compared to a Lithium Ion battery, it is possible to expand the application range to high voltage situations by stacking up more LiS batteries than Li Ion batteries without increasing the total weight for existing equipment. In conventional over-charge/over-discharge protection schemes for such multi-cell, high-voltage packs, two power MOSFETs are implemented in the high-side path of the battery pack, together with a control circuit to drive each of the gates. The rechargeable battery pack is configured such that it can source energy to a load or can be recharged by a charger source. One of the MOSFETs is turned off to cut off the current path when over-charge is detected during the charging phase with a charger; and the other MOSFET is turned off to cut off the current path when over-discharge is detected during the discharging phase with a load. There are two types of such high-side switches: two P-channel MOSFETs connected back-to-back and two N-channel MOSFETs connected back-to-back with an additional charge pump circuit.

The N-channel MOSFET uses electrons as the majority carriers, which have higher mobility than holes, the majority carriers in the P-channel MOSFET. This means that, with the same physical dimensions, the N-channel MOSFET has higher transconductance than the P-channel MOSFET, which translates to lower drain-source resistance during the ON state, or $R_{DSON}$. Typically, the $R_{DSON}$ of the N-channel MOSFET is two to three times lower than that of a similar-sized P-channel MOSFET, hence a higher drain current $I_D$ by a similar factor. This also means that, for the same $R_{DSON}$ and $I_D$, the N-channel MOSFET typically requires less silicon, and therefore is less expensive than the P-channel MOSFET. One fundamental property of the N-channel MOSFET is that for the switch to operate in the linear region while it is on, the gate voltage $V_G$ needs to be higher than the drain voltage $V_D$ by a value of the threshold voltage $V_T$. The $V_D$ is normally connected to the high-side input voltage, which is the highest voltage seen by the switch. Therefore, the $V_G$ has to be either "level shifted up" from an existing voltage or "biased up" by a DC offset, both requiring additional circuitry. If the gate voltage is level-shifted up, typically a charge pump is needed. The charge pump requires an internal oscillator, and at least one "flying" capacitor on the chip to produce the gate voltage. This adds design complexity and silicon, which offsets the silicon (and cost) reduction gained by the N-channel MOSFET's lower $R_{DSON}$ property.

BRIEF DESCRIPTION OF THE DRAWINGS

The present invention is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE SPECIFIC EMBODIMENTS

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes may be made in the function and arrangement of elements without departing from the spirit and scope as set forth in the appended claims.

The battery protection circuit according to the present invention incorporates two N-channel MOSFETs in the low-side path of a battery pack for providing protection functions for the battery pack when abnormal conditions such as over-charge, over-discharge, over-current, or over-temperature conditions occur. The battery pack may contain any number of batteries (e.g., one, two, three, four, six, eight, ten, twelve, fourteen, sixteen, or twenty). For the case of LiS batteries from Sion Power™, the voltage range is rated at 1.7V to 2.5V in the product specification. Thus, the pack voltage of a multi-cell LiS battery pack can be 1.7V or greater, for example, 2.5V, 5V, 7.5V, 10V, 12.5V, 15V, 17.5V, 20V, 25V, 30V, 35V, 40V, 45V or 50V, depending on the number of batteries in the pack. In addition to a controller having various detection and control functions, the battery protection circuit according to the present invention incorporates a gate protection circuit for protecting the gates of the MOSFETs from high voltages.

Figure 1:
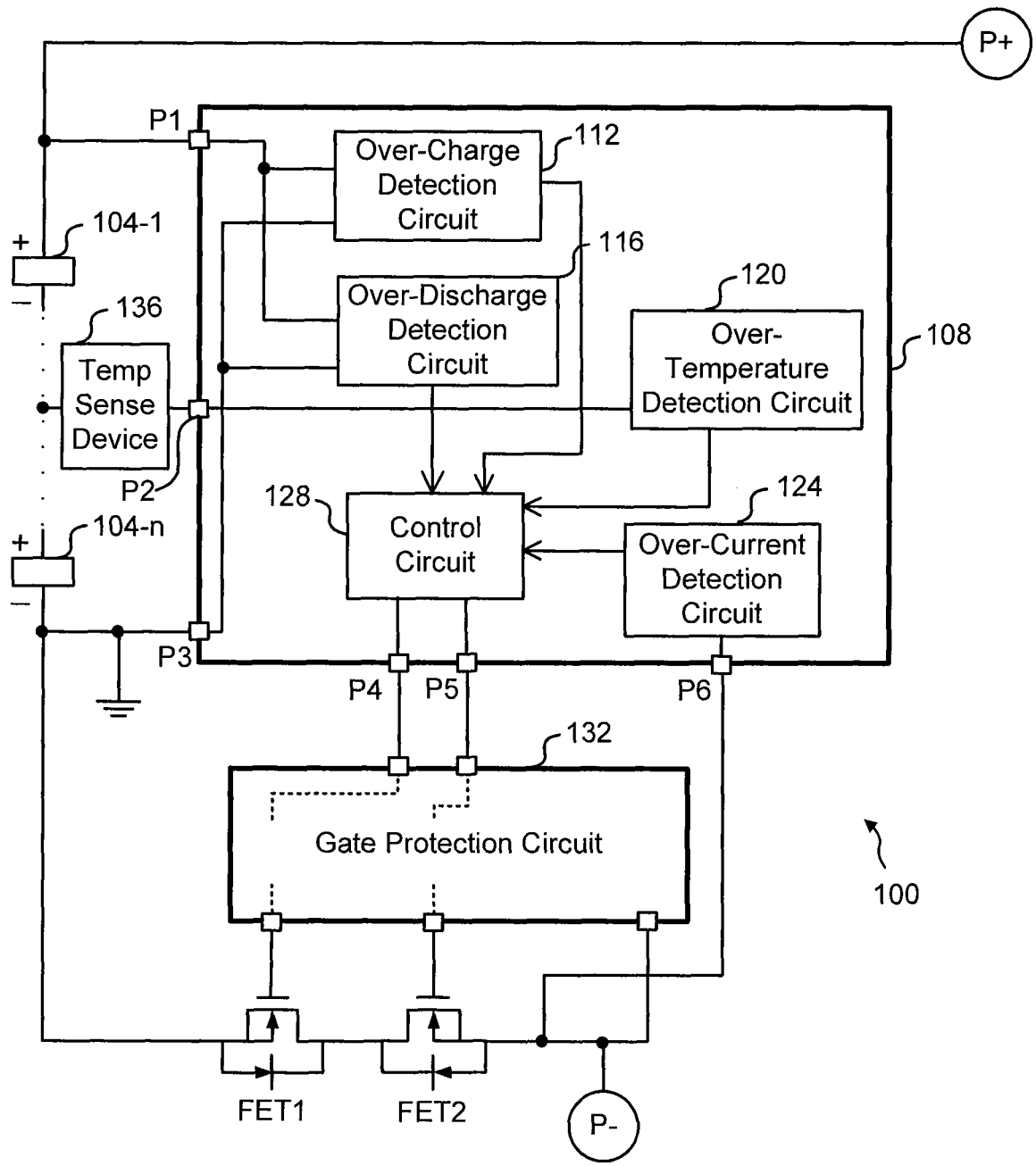
FIG. 1 is a block diagram showing a battery protection circuit, according to the first embodiment of the present invention, coupled to a plurality of batteries in series.

FIG. 1 is a block diagram showing a battery protection circuit 100 according to a first embodiment, coupled to a plurality of batteries 104-1 through 104-$n$ connected in series. P+ denotes a positive terminal, which is a connection point to an external device at the positive side of the battery pack; and P− denotes a negative terminal, which is a connection point to the external device at the negative side of the battery pack. When the batteries need to be recharged, a charger is attached to P+ and P−, and the charge current flows from P+ through the battery pack to P−. When a load is attached to P+ and P−, the battery pack sources energy to the load, and the discharge current flows from P+ through the load to P−. A controller 108 comprises an over-charge detection circuit 112, an over-discharge detection circuit 116, an over-temperature detection circuit 120, an over-current detection circuit 124 and a control circuit 128, and outputs control signals for controlling ON/OFF of the two N-channel MOSFETs (FET1 and FET2) in the low-side path. A gate protection circuit 132 is provided to protect the gates from high voltages. (Details of the gate protection circuit 132 are given later in this section.) A temperature sensing device 136 is provided to sense the temperature of a representative spot of the battery pack and sends the temperature information to the over-temperature detection circuit 120 in the controller 108.

FET1 is used as a discharge control switch, whereas FET2 is used as a charge control switch. These two MOSFETs are coupled in series in a common drain configuration. The over-charge detection circuit 112 and the over-discharge detection circuit 116 monitor a voltage across the entire battery pack in the present embodiment. Alternatively, a voltage across any number of batteries in the pack may be monitored (e.g., one, two, three, four, six, eight, ten, twelve, fourteen, or sixteen). During normal operations, where the monitored voltage is within the range between predetermined upper and lower bounds, FET1 and FET2 are ON, allowing current flow for either charging or discharging situation. When both FET1 and FET2 are ON, the current does not go through either of the body diodes. Therefore, the voltage drop and hence the power dissipation in each of the MOSFETs are determined by the $R_{DSON}$. The power dissipation and resultant heating during the normal operation are thus reduced by employing the low-on resistance N-channel MOSFETs in this embodiment instead of P-channel MOSFETs with the similar size.

The over-charge condition may be defined as a condition wherein the monitored voltage exceeds the predetermined upper bound, i.e. an over-charge detection voltage. When the over-charge condition occurs, the over-charge detection circuit 112 detects the monitored voltage exceeding the over-charge detection voltage and sends the information to the control circuit 128, which sends a control signal through the gate protection circuit 132 to the gate of FET2 to turn off the charge control switch FET2. When FET2 is OFF, a possible path for the charge current to pass is through the body diode in FET2; however, the body diode is reverse-biased in the common-drain configuration as shown in FIG. 1, and thus the charge current is shut off except for a small amount of leakage current. When the monitored voltage which exceeded the over-charge detection voltage falls below a predetermined voltage level, i.e. an over-charge cancellation voltage, the charge control switch FET2 is turned back on, and the normal operation resumes. The over-charge cancellation voltage may be defined to be either equal to or different from the over-charge detection voltage depending on the battery chemistry. In another embodiment, both FET1 and FET2 are turned off when the over-charge condition occurs, and turned back on when the over-charge condition ends. In this case, the circuit is configured such that the gate protection circuit 132 and the control circuit 128 are connected at a single output pin (e.g. at P4 only instead of P4 and P5 shown in FIG. 1) in order to control ON/OFF of both FET1 and FET2 in response to the same control signal from the control circuit 128.

Similarly, the over-discharge condition may be defined as a condition wherein the monitored voltage falls below the predetermined lower bound, i.e. an over-discharge detection voltage. When the over-discharge condition occurs, the over-discharge detection circuit 116 detects the monitored voltage below the over-discharge detection voltage and sends the information to the control circuit 128, which sends a control signal through the gate protection circuit 132 to the gate of FET1 to turn off the discharge control switch FET1. When FET1 is OFF, a possible path for the discharge current to pass is through the body diode in FET1; however, the body diode is reverse-biased in the common-drain configuration as shown in FIG. 1, and thus the discharge current is shut off except for a small amount of leakage current. When the monitored voltage which fell bellow the over-discharge detection voltage becomes equal to or higher than another predetermined voltage level, i.e. an over-discharge cancellation voltage, the discharge control switch FET1 is turned back on, and the normal operation resumes. The over-discharge cancellation voltage may be defined to be either equal to or different from the over-discharge detection voltage depending on the battery chemistry. In another embodiment, both FET1 and FET2 are turned off when the over-discharge condition occurs, and turned back on when the over-discharge condition ends. In this case, the circuit is configured such that the gate protection circuit 132 and the control circuit 128 are connected at a single output pin (e.g. at P4 only instead of P4 and P5 shown in FIG. 1) in order to control ON/OFF of both FET1 and FET2 in response to the same control signal from the control circuit 128.

When the charging or discharging current exceeds a predetermined current value due to short-circuiting or the like, as detected by the over-current detection circuit 124, FET1 is turned off for the discharging case or FET2 is turned off for the charging case. The turned-off MOSFET is turned back on when the discharging or charging current which exceeded the predetermined current value falls below the predetermined current value, and the normal operation resumes. In another embodiment, both FET1 and FET2 are turned off when the over-current condition occurs, and turned back on when the over-current condition ends. In this case, only a single output pin of the controller 108 is used to send a control signal to control ON/OFF of both FET1 and FET2. In one example, the over-current condition is detected when the voltage at the input pin for the over-current detection (e.g. P6 as shown in FIG. 1) exceeds a predetermined voltage level, i.e. an over-current detection voltage. In another example, a sense resistor is inserted in the current path such that the voltage across the sense resistor and hence the current can be measured. In this case, two nodes on both sides of the sense resistor are connected to two pins of the controller 108, respectively. A wide variety of over-current sensing techniques are known by those skilled in the art; thus, details are omitted here in the description as well as in the drawings.

Prevention measures of battery overheating are also incorporated in the battery protection circuit according to the present invention. The temperature sensing device 136 is provided to sense a "hot spot" of the battery pack. This spot could be, for example, on a battery located near the center of the pack. Specifically, the temperature sensing device 136 can be a thermistor, a thermocouple, an RTD (Resistance Temperature Detector), an IR thermometer and the like. The temperature is sensed by the temperature sensing device 136, and the temperature information is sent to the over-temperature detection circuit 120. When the temperature exceeds a predetermined temperature value, the over-temperature detection circuit 120 sends the information to the control circuit 128, which sends a control signal through the gate protection circuit 132 to the gate of FET1 to turn off FET1 for the discharging case or to the gate of FET2 to turn off FET2 for the charging case. When the temperature which exceeded the predetermined temperature value falls below the predetermined temperature value, the turned-off MOSFET is turned back on to resume the normal operation. In another embodiment, both FET1 and FET2 are turned off when the over-temperature condition occurs, and turned back on when the over-temperature condition ends. In this case, only a single output pin of the controller 108 is used to send a control signal to control ON/OFF of both FET1 and FET2.

For the case of a multi-cell, high voltage battery pack, the high voltage potential impressed by the pack (or even a greater potential depending on the bias) can be imposed on the output pins of the controller 108. If the gates of the MOSFETs in the low-side path are directly connected to the output pins without protection, the gate-to-source voltages can exceed the maximum allowable voltage, which is around 20V in a N-channel MOSFET, resulting in gate oxide breakdown. Therefore, the use of MOSFETs in the low-side path is limited to small cell count (e.g., one or two cells in series), low voltage packs in the absence of proper gate protections. To circumvent the high voltage potential issue associated with the use of multi-cell, high voltage packs, one design choice is to implement P-channel MOSFETs or N-channel MOSFETs with charge pumps in the high-side path of the protection circuit. In marked contrast, the present invention incorporates the N-channel MOSFETs in the low-side path and provides the gate protection circuit 132 to lower the gate-to-source voltages to the safe level, thereby allowing a multi-cell, high voltage pack even with the low-side N-channel MOSFETs. Through utilization of a circuit topology with a lowest possible component count for the gate protection circuit 132, the cost of the overall battery protection circuit 100 becomes lower than the case of using P-channel MOSFETs or N-channel MOSFETs with charge pumps in the high-side path. At the same time, the operating range of charge voltages and pack voltages (proportional to the number of cells in the pack) is widened.

Figure 2:
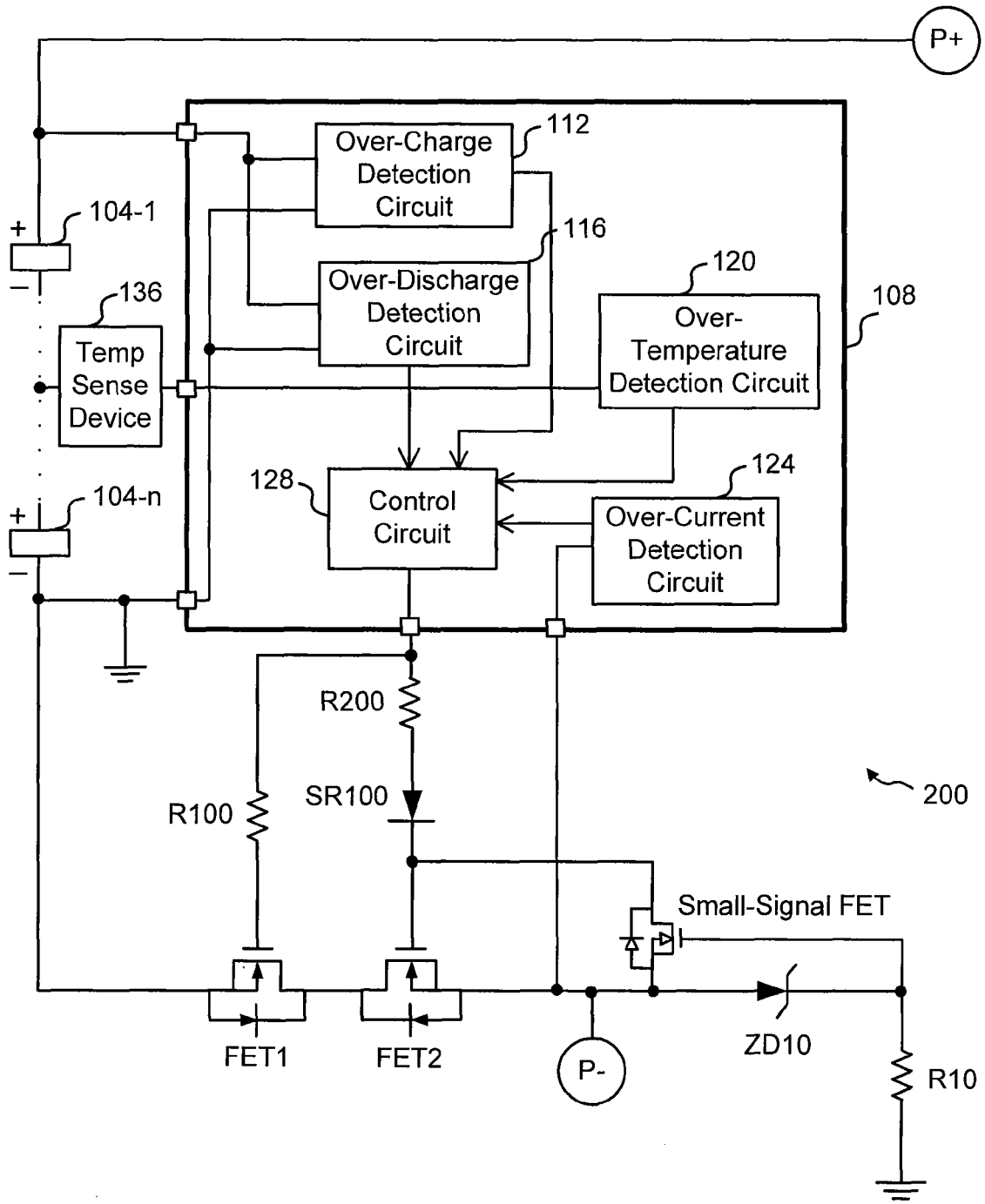
FIG. 2 is a block diagram showing a battery protection circuit, according to the second embodiment of the present invention, coupled to a plurality of batteries in series.

FIG. 2 is a block diagram showing a protection circuit 200 according to a second embodiment of the present invention. A specific implementation of the gate protection circuit 132 is depicted. In this embodiment, the gate protection circuit 132 comprises three resistors R10, R100 and R200, one Schottky diode SR100, one Zener diode ZD10, and one small-signal FET. The resistor R10 is connected to the second ground. P− is connected to a point internal to the point where the small-signal FET is connected. The gates of FET1 and FET2 are coupled to the common output pin of the controller 108, receiving a control signal from the control circuit 128. Thus, ON/OFF of FET1 and FET2 is controlled by the same control signal from the single output pin in this embodiment. In another embodiment, the circuit is configured such that the two gates receive separate control signals from respective output pins to separately control ON/OFF of the two MOSFETs.

The voltage at the output pin (i.e. the output voltage of the controller 108) can be varied from zero to a high value defined by the voltage supplied to the controller 108, which is the pack voltage. For the discharge control switch FET1, the gate-to-source voltage does not exceed the output voltage of the controller 108. Thus, FET1 can be operated safely by setting the output voltage of the controller 108 to be less than the allowable maximum gate-to-source voltage. To turn on FET1, the controller 108 supplies a voltage to the gate, that is greater than the gate threshold voltage, which is typically 1-4V.

Figure 3:
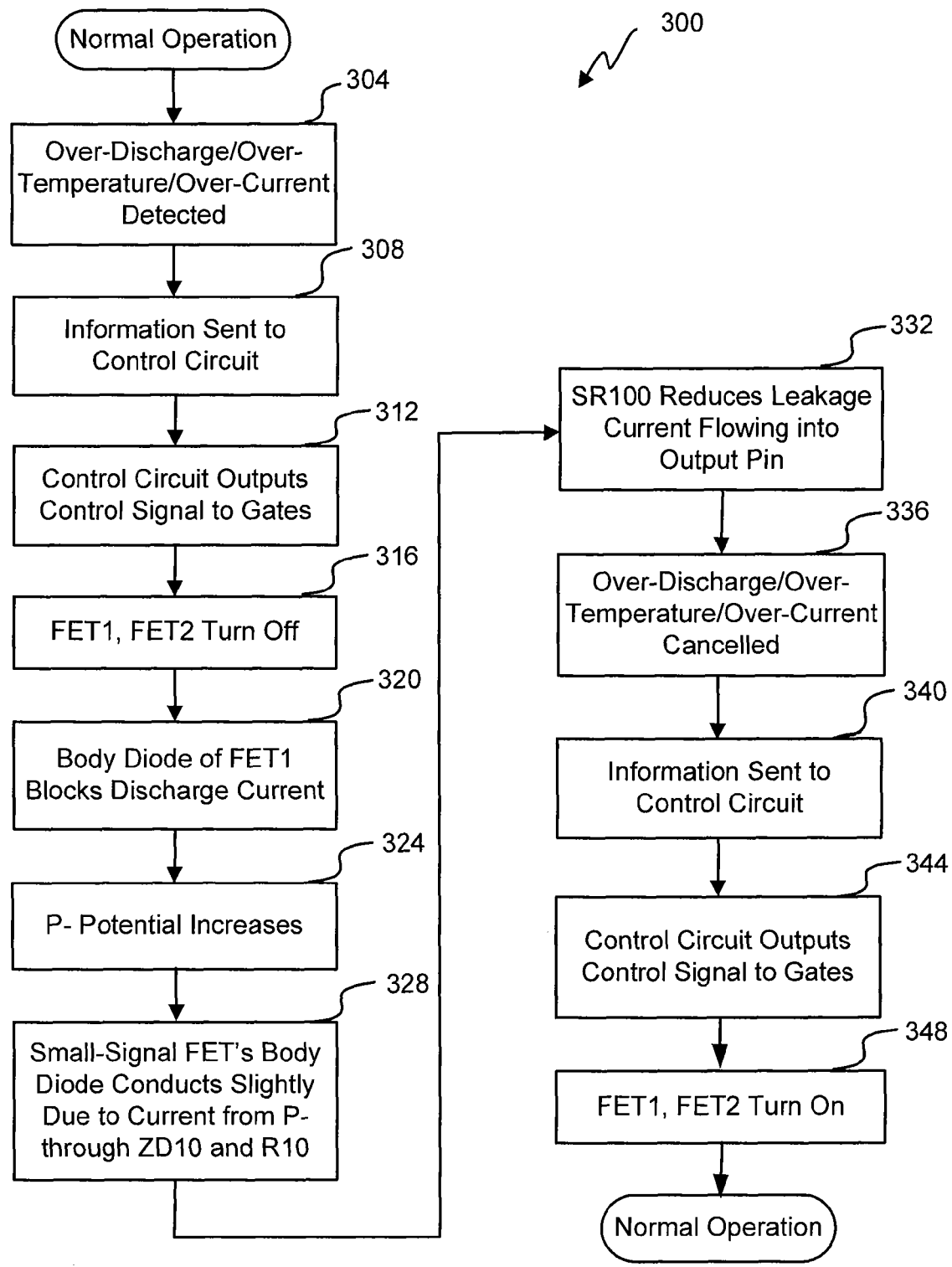
FIG. 3 is a flow diagram showing a discharging process according to the second embodiment when a load is attached.

FIG. 3 is a flow diagram showing a discharging process 300 according to the second embodiment when a load is attached to the terminals P+ and P−. When an abnormal condition such as an over-discharge condition occurs, the over-discharge detection circuit 116 detects the monitored voltage below the over-discharge detection voltage at block 304 and sends the information to the control circuit 128 at block 308, which sends a control signal to the gate of FET1 at block 312 to turn off the discharge control switch FET1. In the present embodiment both FET1 and FET2 are turned off at block 316 by the same control signal from the single output pin of the controller 108. The discharge current can be interrupted when another abnormal condition such as an over-current or over-temperature condition is detected at block 304. When FET1 is OFF, a possible path for the discharge current to pass is through the body diode in FET 1; however, the body diode is reverse-biased in the common-drain configuration as shown in FIG. 2, and thus the discharge current is interrupted except for a small amount of leakage current at block 320.

When the load is attached and the MOSFETs are OFF, the P− potential drifts up at block 324 to the P+ potential level due to the lower impedance of the load than the interrupted discharging path. At step 328, the body diode of the small-signal FET conducts slightly due to a current flow from P− (that is now at the P+ potential level) through ZD10 and R10. At step 332, SR100, which is a high voltage Schottky diode (e.g. 100V blocking voltage for a 20V battery pack) reduces the leakage current that would otherwise flow into the controller 108.

When the monitored voltage which fell bellow the over-discharge detection voltage becomes equal to or higher than another predetermined voltage level, i.e. an over-discharge cancellation voltage, the discharge control switch FET1 is turned back on (blocks 336-348), and the normal operation resumes. In the present embodiment, both FET1 and FET2 are turned back on at block 348 by the same control signal from the single output pin of the controller 108. The over-discharge cancellation voltage may be defined to be either equal to or different from the over-discharge detection voltage depending on the battery chemistry. Cancellation of another abnormal condition such as an over-current or over-temperature condition is also carried out at block 336.

Figure 4:
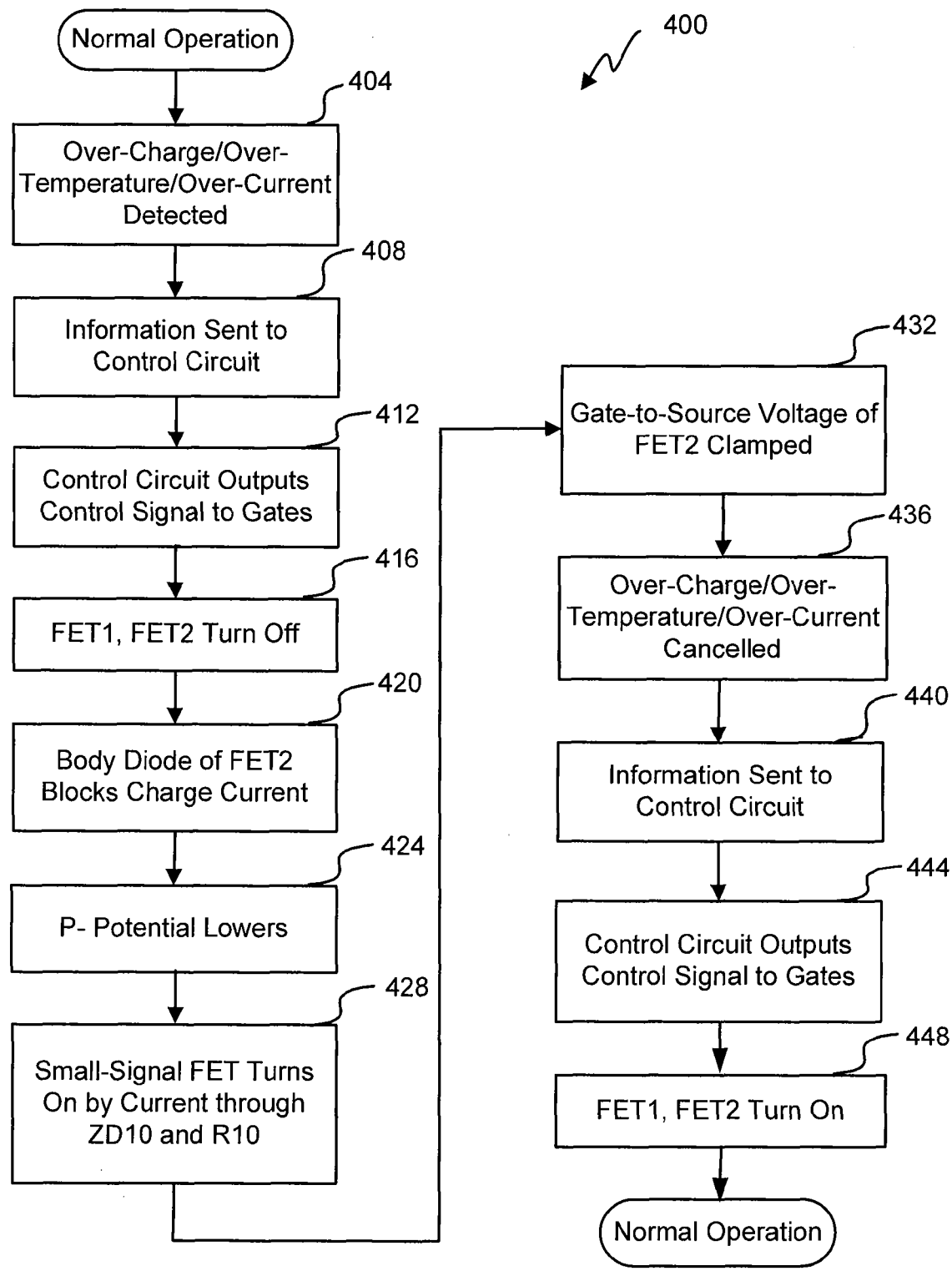
FIG. 4 is a flow diagram showing a charging process according to the second embodiment when a charger is attached.

FIG. 4 is a flow diagram showing a charging process 400 according to the second embodiment when a charger is attached to the terminals P+ and P−. When an abnormal condition such as an over-charge condition occurs, the over-charge detection circuit 112 detects the monitored voltage exceeding the over-charge detection voltage at block 404 and sends the information to the control circuit 128 at block 408, which sends a control signal to the gate of FET2 at block 412 to turn off the charge control switch FET2. In the present embodiment both FET1 and FET2 are turned off at block 416 by the same control signal from the single output pin of the controller 108. The charge current can be interrupted when another abnormal condition such as an over-current or over-temperature condition is detected at block 404. When FET2 is OFF, a possible path for the discharge current to pass is through the body diode in FET2; however, the body diode is reverse-biased in the common-drain configuration as shown in FIG. 2, and thus the discharge current is interrupted except for a small amount of leakage current at block 420.

When a charger is attached and the MOSFETs are OFF, the voltage at P− decreases at block 424 and may drop several volts below reference ground depending on the capability of the charger. If this voltage drops too low, the gate-to-source voltage of FET2 could exceed the maximum allowable voltage, which is typically 20V. As the P− voltage lowers, current starts to flow through R10 and ZD10. This allows the small-signal FET to turn on at block 428 and clamp the gate-to-source voltage of FET2 at block 432, thereby preventing the damaging voltage from being impressed between the gate and source of FET2. Further, R100 and R200 provide voltage drops for respective gates as a buffer.

When the monitored voltage which exceeded the over-charge detection voltage becomes equal to or lower than another predetermined voltage level, i.e. an over-charge cancellation voltage, the charge control switch FET2 is turned back on (blocks 436-448), and the normal operation resumes. In the present embodiment, both FET1 and FET2 are turned back on at block 448 by the same control signal from the single output pin of the controller 108. The over-charge cancellation voltage may be defined to be either equal to or different from the over-charge detection voltage depending on the battery chemistry. Cancellation of another abnormal condition such as an over-current or over-temperature condition is also carried out at block 436.

Figure 5:
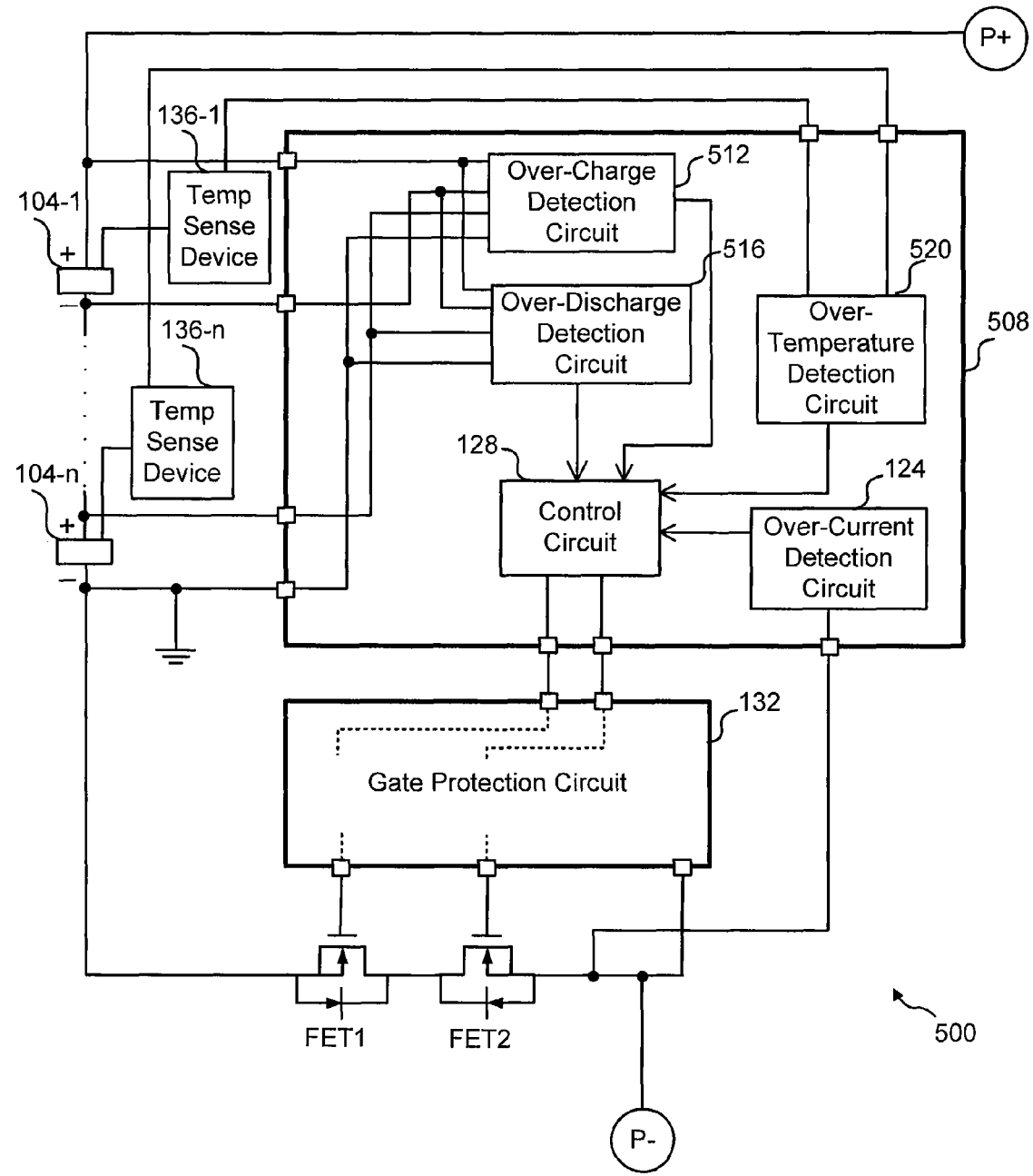
FIG. 5 is a block diagram showing a battery protection circuit, according to the third embodiment of the present invention, coupled to a plurality of batteries in series.

FIG. 5 shows a battery protection circuit 500 according to a third embodiment of the present invention. In this embodiment, a voltage across each of the batteries 104-1-104-n is monitored by an over-charge detection circuit 512 and an over-discharge detection circuit 516. In addition, temperature sensing devices 136-1-136-n are provided to sense the batteries 104-1 through 104-n, respectively, and an over-temperature detection circuit 520 receives the respective temperature information. In FIG. 5, only the connections for the first (104-1) and last (104-n) batteries are explicitly shown for the sake of simplicity; however, it should be understood that proper connections are provided so as to monitor the voltages across individual batteries and individual battery temperatures in this embodiment. Compared to the first embodiment wherein the entire pack voltage (or alternatively the voltage across one, two, three or any number of batteries in the pack) and the temperature of one battery of the pack are monitored to detect abnormal conditions, the present embodiment allows for individual battery monitoring. Therefore, when the over-charge, over-discharge, over-temperature or over-current condition is detected in at least one battery, the control circuit receives the information and sends a control signal to turn off one of or both the MOSFETs to interrupt the current flow.

In this individual monitoring scheme, the number of connections and hence the number of pins of the controller 508 to be used increase as the number of batteries increases in the pack. In some embodiments, these monitoring connections are reduced due to limitations arising from the controller capability, packaging requirements, circuit real estate and the like. For example, monitoring of every other battery temperature may suffice for certain battery chemistry. Here, a "battery temperature" is defined as the temperature associated with one battery. In this example, detection of the over-temperature condition in at least one battery triggers the turn-off action. In another example, the battery pack includes "balanced" batteries with nearly the same capacity and state of charge so that only a few cell voltages may be monitored as representatives. Here, a "cell voltage" is defined as a voltage across one battery. In this example, detection of the over-charge or over-discharge condition in at least one battery triggers the turn-off action. Note that a certain degree of "cell-balancing" can be achieved by assembling the pack using batteries from the same supplier and production lot.

Automatic turn-on mechanisms of one or both of the MOSFETs are incorporated in the aforementioned embodiments, wherein the controller detects that an abnormal condition that triggered the turn-off action has ended or cancelled. However, for example, when an over-current condition is detected due to short-circuiting or other irreversible problems, the load or charger is removed and the entire circuit is shut down for diagnosis. Normally, after the problem is fixed, the load or charger is reattached and the circuit is turned back on manually. Thus, the automatic turn-on mechanisms are not necessary. In such cases, the protection circuit can be configured such that only turn-off mechanisms are incorporated.

Figure 6:
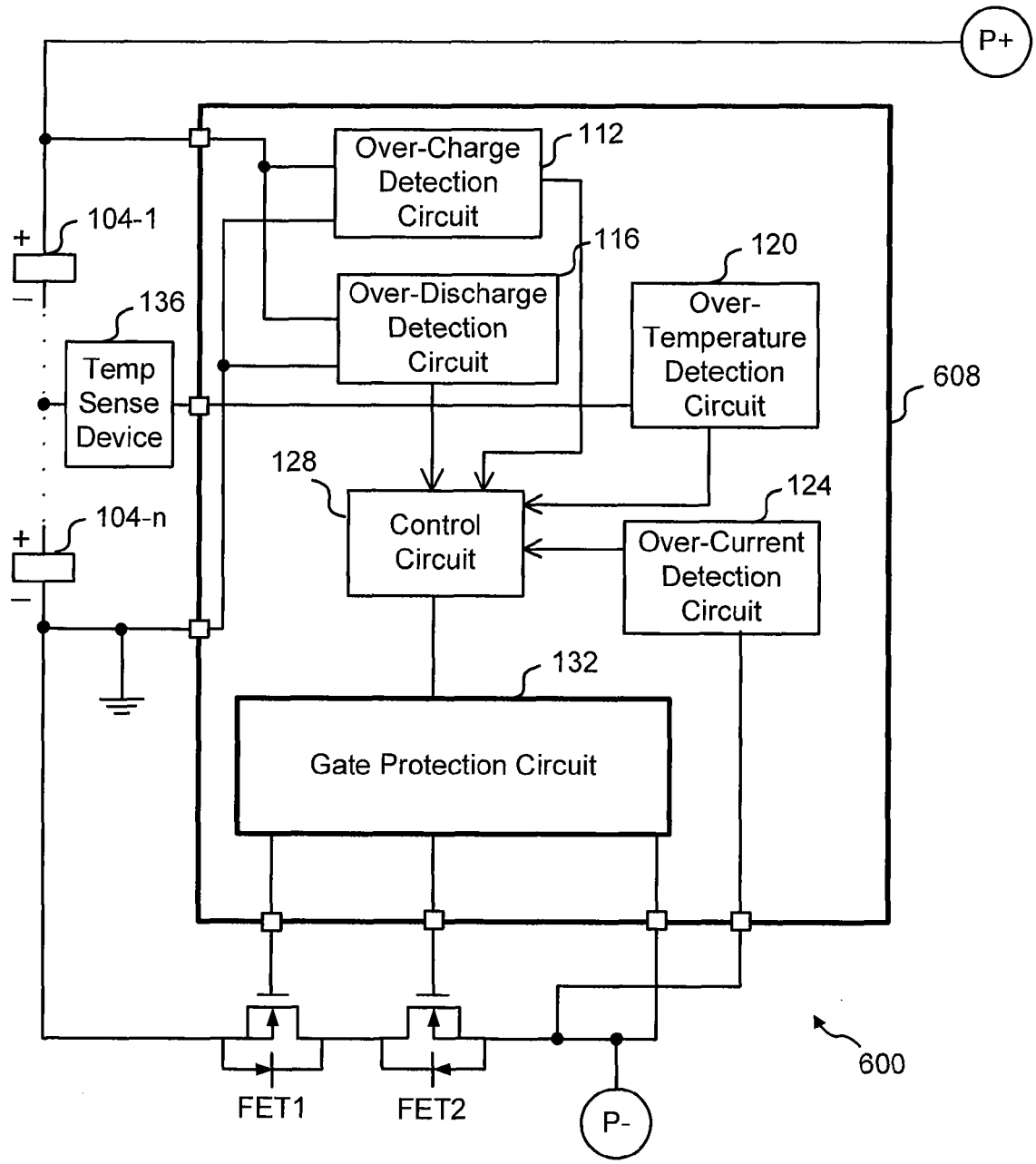
FIG. 6 is a block diagram showing a battery protection circuit according to a fourth embodiment of the present invention, coupled to a plurality of batteries in series.

FIG. 6 is a block diagram showing a battery protection circuit 600 according to a fourth embodiment of the present invention. In this embodiment, the gate protection circuit 132 is integrated with various detection and control circuits on a same chip to provide a control IC 608. Thus, the battery protection circuit 600 comprises two discrete power MOSFETs (FET1 and FET2) and the control IC 608, resulting in reduced parts count.

Figure 7:
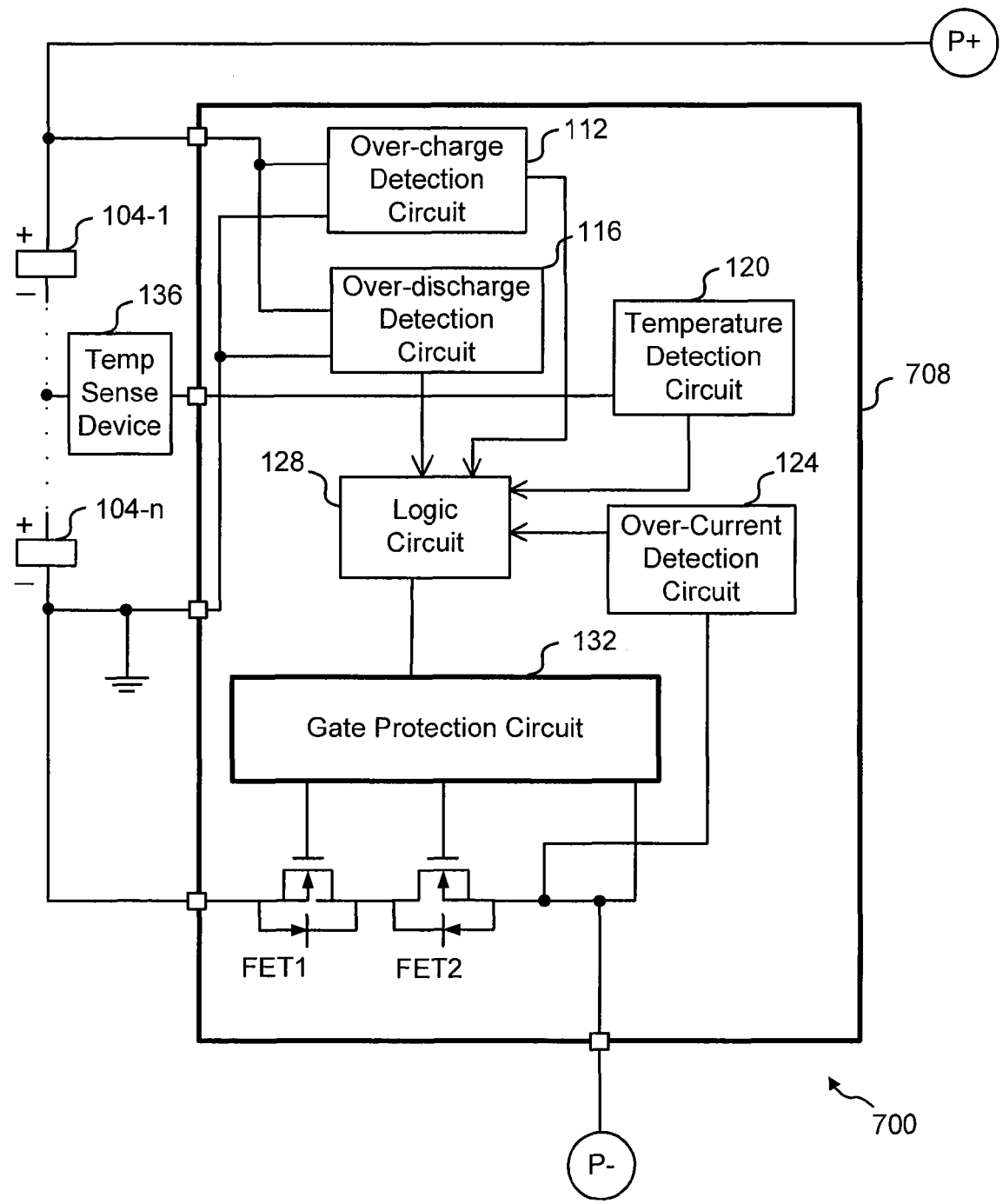
FIG. 7 is a block diagram showing a battery protection circuit according to a fifth embodiment of the present invention, coupled to a plurality of batteries in series.

FIG. 7 is a block diagram showing a battery protection circuit 700 according to a fifth embodiment of the present invention. In this embodiment, the gate protection circuit 132, two MOSFETs and various detection and control circuits are integrated on a single chip to provide a battery protection IC 708. The integration of low-voltage logic functions with high-voltage or high-power devices, commonly referred to as power integration, can be realized by various advanced fabrication techniques. In one exemplary technique, dielectric isolation can be employed to combine a metal-oxide-semiconductor (NMOS and PMOS) and other low-voltage elements with a bipolar junction transistor (BJT), a double-diffused metal-oxide semiconductor (DMOS) and other high-voltage elements. In another exemplary technique, a high-voltage MOSFET can be fabricated by combining a plurality of NMOS and PMOS. These high-voltage elements can be incorporated by use of a variety of fabrication methods such as NMOS, CMOS, Bipolar, BiCMOS, BiNMOS and the like as known to those skilled in the art.

It is possible to integrate different sections depending on fabrication capabilities, cost and various other considerations. For example, the gate protection circuit and the two MOSFETs may be integrated on a chip, leaving the controller 108 as it is. In another example, a subset of the gate protection circuit 108, such as only the resistors and the small-signal FET in the second embodiment shown in FIG. 2, may be integrated with the controller 108, leaving discrete diodes as they are.

A number of variations and modifications of the disclosed embodiments can also be used. For example, over-charge, over-discharge, over-temperature and over-current conditions are detected in the disclosed embodiments. However, a subset of those conditions, for example, only the over-charge and over-discharge conditions may be detected. In another example, the connections from the control circuit to the gates via the gate protection circuit may be one or two using one or two output pins, respectively, depending on the switching flexibility required for turn-on/off actions in any one of the embodiments. Further, as described earlier, the voltage monitoring for detecting the over-charge or over-discharge condition may be performed across one, two or any number of batteries including across the entire battery pack. In another embodiment, the connections are configured such that individual cell voltages are monitored. In this case, a cell voltage is defined as a voltage across one battery; one, two or any number of cell voltages may be monitored individually. In this individual cell voltage monitoring scheme, the over-charge or over-discharge condition in at least one battery triggers the turn-off action. Similarly, the temperature monitoring can be performed on one, two or any number of batteries. Again, in this case, detection of the over-temperature condition in at least one battery triggers the turn-off action.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

While the principles of the disclosure have been described above in connection with specific apparatuses and methods, it is to be clearly understood that this description is made only by way of example and not as limitation on the scope of the disclosure.

What is claimed is:

1. A battery protection circuit for protecting a plurality of batteries connected in series by controlling: (1) a discharging current flowing from the batteries through a load detachably attached between a positive terminal and a negative terminal, or (2) a charging current flowing to the batteries from a charger detachably attached between the positive terminal and the negative terminal, the battery protection circuit comprising: a controller for monitoring the batteries and outputting control signals based on predetermined conditions associated with the batteries; a first N-channel MOSFET and a second N-channel MOSFET coupled in a common-drain configuration in a low-side path, wherein at least one of the first and second N-channel MOSFETs turns off in response to the control signal received from the controller when at least one of the predetermined conditions is detected; and a gate protection circuit for preventing gate-to-source voltages of the first and second N-channel MOSFETs from exceeding a predetermined voltage level; wherein the gate protection circuit comprises: a small-signal FET having a drain coupled to a gate of the second N-channel MOSFET and a source coupled to the negative terminal, wherein the small-signal FET turns on and clamps the gate-to-source voltage of the second N-channel MOSFET when the gate-to-source voltage of the second N-channel MOSFET increases to a predetermined gate-to-source voltage level during a period when the second N-channel MOSFET is off and the charger is attached.

2. The battery protection circuit according to claim 1, wherein:
the first N-channel MOSFET turns off the discharging current in response to the control signal when the load is attached; and
the second N-channel MOSFET turns off the charging current in response to the control signal when the charger is attached.

3. The battery protection circuit according to claim 1, wherein the gate protection circuit further comprises:
a first diode having an anode coupled to the source of the small-signal FET and a cathode coupled to a gate of the small-signal FET; and
a first resistor having one end coupled to the cathode of the first diode and the other end coupled to a ground,
wherein current that flows through the first diode and the first resistor controls ON/OFF of the small-signal FET.

4. The battery protection circuit according to claim 1, wherein the gate protection circuit further comprises:
a second diode having an anode coupled to an output pin of the controller and a cathode coupled to the gate of the second N-channel MOSFET and the drain of the small-signal FET for reducing leakage current flowing into the output pin.

5. The battery protection circuit according to claim 1, wherein the gate protection circuit further comprises:
a second resistor coupled to an output pin of the controller and to a gate of the first N-channel MOSFET for providing a voltage drop to the gate of the first N-channel MOSFET; and
a third resistor coupled to the output pin of the controller and the gate of the second N-channel MOSFET for providing a voltage drop to the gate of the second N-channel MOSFET.

6. The battery protection circuit according to claim 2, wherein the controller comprises:
an over-discharge detection circuit for detecting an over-discharge condition as the predetermined condition, the over-discharge detection circuit monitoring at least one cell voltage and processing information on the over-discharge condition when at least one cell voltage falls below a predetermined over-discharge detection voltage.

7. The battery protection circuit according to claim 6, wherein the over-discharge detection circuit further detects an over-discharge cancellation and processes information on the over-discharge cancellation for turning on the first N-channel MOSFET when the at least one cell voltage exceeds a predetermined over-discharge cancellation voltage.

8. The battery protection circuit according to claim 2, wherein the controller comprises:
an over-charge detection circuit for detecting an over-charge condition as the predetermined condition, the over-charge detection circuit monitoring at least one cell voltage and processing information on the over-charge condition when at least one cell voltage exceeds a predetermined over-charge detection voltage.

9. The battery protection circuit according to claim 8, wherein the over-charge detection circuit further detects an over-charge cancellation and processes information on the over-charge cancellation for turning on the second N-channel MOSFET when the at least one cell voltage falls below a predetermined over-charge cancellation voltage.

10. The battery protection circuit according to claim 2, wherein the controller comprises:
an over-current detection circuit for detecting an over-current condition as the predetermined condition, the over-current detection circuit monitoring the charging or discharging current and processing information on the over-current condition when the charging or discharging current exceeds a predetermined over-current value.

11. The battery protection circuit according to claim 10, wherein the over-current detection circuit further detects an over-current cancellation and processes information on the over-current cancellation for turning on the first N-channel MOSFET for the discharging current when the discharging current falls below the predetermined over-current value, or turning on the second N-channel MOSFET for the charging current when the charging current falls below the predetermined over-current value.

12. The battery protection circuit according to claim 2, further comprising at least one temperature sensing device for measuring at least one battery temperature, respectively, wherein the controller comprises:
an over-temperature detection circuit for detecting an over-temperature condition as the predetermined condition based on measurements by the at least one temperature sensing device, the over-temperature detection circuit processing information on the over-temperature condition when at least one battery temperature exceeds a predetermined temperature value.

13. The battery protection circuit according to claim 12, wherein the over-temperature detection circuit further detects an over-temperature cancellation and processes information on the over-temperature cancellation for turning on the first N-channel MOSFET for the discharging current or the second N-channel MOSFET for the charging current when the at least one battery temperature falls below the predetermined temperature value.

14. The battery protection circuit according to claim 1, wherein at least part of the gate protection circuit is integrated with the controller on a same chip.

15. The battery protection circuit according to claim 1, wherein at least part of the gate protection circuit is integrated with the first and second N-channel MOSFETs on a same chip.

16. The battery protection circuit according to claim 1, wherein at least part of the gate protection circuit and the first and second N-channel MOSFETs are integrated with the controller on a same chip.

17. The battery protection circuit according to claim 1, the battery is a Lithium Sulfur battery.

18. A battery protection circuit comprising:
a positive terminal and a negative terminal configured to be coupled to a plurality of batteries in series, the plurality of batteries having a total voltage of 7.5 volts or greater, wherein
a discharging current flows from the batteries through a load detachably attached between the positive terminal and the negative terminal, or
a charging current flows to the batteries from a charger detachably attached between the positive terminal and the negative terminal;
a controller for monitoring the batteries and outputting control signals based on predetermined conditions associated with the batteries;
a first N-channel MOSFET and a second N-channel MOSFET coupled in a common-drain configuration in a low-side path, wherein
the first N-channel MOSFET turns off the discharging current in response to the control signal, and
the second N-channel MOSFET turns off the charging current in response to the control signal; and
a small-signal FET that turns on and clamps a gate-to-source voltage of the second N-channel MOSFET when the gate-to-source voltage of the second N-channel MOSFET increases to a predetermined level.

19. The battery protection circuit according to claim 18, further comprising:
a first diode having an anode coupled to a source of the small-signal FET and a cathode coupled to a gate of the small-signal FET, wherein a drain of the small-signal FET is coupled to a gate of the second N-channel MOSFET and the source of the small-signal FET is further coupled to the negative terminal;
a first resistor having one end coupled to the cathode of the first diode and the other end coupled to a ground, wherein current that flows through the first diode and the first resistor controls ON/OFF of the small-signal FET;
a second diode having an anode coupled to an output pin of the controller and a cathode coupled to the gate of the second N-channel MOSFET and the drain of the small-signal FET for reducing leakage current flowing into the output pin;
a second resistor coupled to the output pin of the controller and to a gate of the first N-channel MOSFET for providing a first voltage drop to the gate of the first N-channel MOSFET; and
a third resistor coupled to the output pin of the controller and the gate of the second N-channel MOSFET for providing a second voltage drop to the gate of the second N-channel MOSFET.

20. The battery protection circuit according to claim 18, wherein the controller comprises:
an over-discharge detection circuit for detecting an over-discharge condition as one of the predetermined conditions, the over-discharge detection circuit monitoring at least one cell voltage and processing information on the over-discharge condition when at least one cell voltage exceeds a predetermined over-discharge detection voltage; and
an over-charge detection circuit for detecting an over-charge condition as another of the predetermined conditions, the over-charge detection circuit monitoring at least one cell voltage and processing information on the over-charge condition when at least one cell voltage exceeds a predetermined over-charge detection voltage.

21. The battery protection circuit according to claim 18, wherein the controller comprises:

an over-current detection circuit for detecting an over-current condition as the predetermined condition, the over-current detection circuit monitoring the charging or discharging current and processing information on the over-current condition when the charging or discharging current exceeds a predetermined over-current value.

22. The battery protection circuit according to claim 18, further comprising at least one temperature sensing device for measuring at least one battery temperature, respectively, wherein the controller comprises:
 an over-temperature detection circuit for detecting an over-temperature condition as the predetermined condition based on measurements by the at least one temperature sensing device, the over-temperature detection circuit processing information on the over-temperature condition when at least one battery temperature exceeds a predetermined temperature value.

23. The battery protection circuit according to claim 18, the battery is a Lithium Sulfur battery.

24. A battery protection circuit comprising:
 a positive terminal and a negative terminal configured to be coupled to three or more batteries in series, wherein
  a discharging current flows from the batteries through a load detachably attached between the positive terminal and the negative terminal, or
  a charging current flows to the batteries from a charger detachably attached between the positive terminal and the negative terminal;
 a controller for monitoring the batteries and outputting control signals based on predetermined conditions associated with the batteries;
 a first N-channel MOSFET and a second N-channel MOSFET coupled in a common-drain configuration in a low-side path, wherein
  the first N-channel MOSFET turns off the discharging current in response to the control signal, and
  the second N-channel MOSFET turns off the charging current in response to the control signal; and
 a small-signal FET that turns on and clamps a gate-to-source voltage of the second N-channel MOSFET when the gate-to-source voltage of the second N-channel MOSFET increases to a predetermined level.

* * * * *